United States Patent
Graf et al.

(10) Patent No.: US 10,027,904 B2
(45) Date of Patent: Jul. 17, 2018

(54) SYSTEM AND METHOD FOR TRANSMITTING CAMERA-BASED PARAMETERS WITHOUT A DEDICATED BACK CHANNEL

(71) Applicant: Robert Bosch GmbH, Stuttgart (DE)

(72) Inventors: Patrick Graf, Southfield, MI (US); Jeffrey A. Bochenek, Milford, MI (US); Greg Sypitkowski, Farmington Hills, MI (US)

(73) Assignee: Robert Bosch GmbH, Stuttgart (DE)

( * ) Notice: Subject to any disclaimer, the term of this patent is extended or adjusted under 35 U.S.C. 154(b) by 124 days.

(21) Appl. No.: 15/124,496

(22) PCT Filed: Mar. 9, 2015

(86) PCT No.: PCT/US2015/019472
§ 371 (c)(1),
(2) Date: Sep. 8, 2016

(87) PCT Pub. No.: WO2015/138331
PCT Pub. Date: Sep. 17, 2015

(65) Prior Publication Data
US 2017/0078588 A1 Mar. 16, 2017

Related U.S. Application Data

(60) Provisional application No. 61/951,597, filed on Mar. 12, 2014.

(51) Int. Cl.
*H04N 5/268* (2006.01)
*H04N 7/18* (2006.01)
(Continued)

(52) U.S. Cl.
CPC ............... *H04N 5/268* (2013.01); *B60R 1/00* (2013.01); *H04N 5/232* (2013.01); *H04N 7/181* (2013.01);
(Continued)

(58) Field of Classification Search
CPC ............... B60R 1/00; B60R 2300/105; B60R 2300/406; B60R 2300/80; H04N 5/232; H04N 5/268; H04N 7/181
See application file for complete search history.

(56) References Cited

U.S. PATENT DOCUMENTS

| 5,216,502 | A | 6/1993 | Katz |
| 7,365,772 | B2 | 4/2008 | Mizutani et al. |

(Continued)

FOREIGN PATENT DOCUMENTS

| JP | 2006304171 A | 11/2006 |
| JP | 2010188765 A | 2/2010 |
| WO | 2004106857 A1 | 12/2004 |

OTHER PUBLICATIONS

International Search Report and Written Opinion for Application No. PCT/US2015/019472 dated May 20, 2015 (10 pages).

*Primary Examiner* — Anner N Holder
(74) *Attorney, Agent, or Firm* — Michael Best & Friedrich LLP

(57) ABSTRACT

A vehicle system and method for transmitting camera-based parameters and video data includes a video camera disposed on a vehicle for viewing an exterior region. The video camera includes an image sensor for generating a video data stream from an exterior region of the vehicle, a controller for providing camera-based parameters, and an image signal processor. The image signal processor is configured to receive the video stream from the image sensor, receive camera-based parameters from the controller, transfer the camera-based parameters onto the video stream, and output (Continued)

an analog signal that includes the video stream and the camera-based parameters. An electronic control unit receives the analog signal, retrieves the camera-based parameters from the analog signal. A vehicle display receives and displays the video stream.

20 Claims, 4 Drawing Sheets

(51) Int. Cl.
*H04N 5/232* (2006.01)
*H04N 1/00* (2006.01)
*B60R 1/00* (2006.01)

(52) U.S. Cl.
CPC ... *B60R 2300/105* (2013.01); *B60R 2300/406* (2013.01); *B60R 2300/80* (2013.01)

(56) References Cited

U.S. PATENT DOCUMENTS

| | | |
|---|---|---|
| 7,415,718 B1 | 8/2008 | Wang et al. |
| 7,633,554 B2 | 12/2009 | Sloo et al. |
| 2005/0025235 A1 | 2/2005 | Hoang |
| 2007/0064149 A1 | 3/2007 | Yang et al. |
| 2008/0050092 A1 | 2/2008 | Erickson |
| 2012/0002051 A1 | 1/2012 | Nix |
| 2012/0021386 A1 | 1/2012 | Anderson et al. |
| 2013/0141572 A1 | 6/2013 | Torres et al. |

SYSTEM AND METHOD FOR TRANSMITTING CAMERA-BASED PARAMETERS WITHOUT A DEDICATED BACK CHANNEL

RELATED APPLICATIONS

This application claims priority from U.S. Provisional Application No. 61/951,597, filed Mar. 12, 2014, the entire content of which is hereby incorporated by reference.

BACKGROUND

The present invention relates to a vehicle system and method for transmitting camera-based parameters along with video images from a video camera mounted on a vehicle to an endpoint therein for display.

In state of the art camera systems, more than image data from a camera must be received at an endpoint. In driver assistance arrangements, the cameras scan the environment for potential dangers and preemptively warn a driver. The arrangement requires that the relationship between real-world distances and pixel coordinates in an image is well known and accurate. Such arrangements require that each camera is calibrated individually and that the camera parameters are stored directly in each camera's non-volatile memory.

Additionally, for cameras used in driver assistance applications, functional safety is extremely important. To verify functionality of an image sensor, specific camera information is transmitted to a remote processing unit on the vehicle that validates the functional performance of the image sensor.

When implementing driver assistance functions in low-cost video camera hardware, some important issues arise. First, low-cost video camera systems are currently developed around VGA sensors that transmit video in an analog National Television System Committee (NTSC) format. Since NTSC video transmission was developed in the mid-20th century, it does not traditionally allow for embedding of metadata into the video stream (a feature that is often allowed in digital video transmission). For the NTSC format, the standard line resolution for a frame is 525 lines. A frame can be represented as 720 horizontal pixels by 486 vertical pixels. Compression algorithms, including digital video compression, allow for improved resolution.

Another analog video transmission format used in various countries is Phase Alternating Line (PAL) format. For the PAL format, the standard vertical line resolution is 576 lines for a frame. A frame is 720×576 pixels.

In automotive systems, most electronic control units (ECU's) have a connection to a vehicle bus (i.e. PSIS, DSI, SENT, CAN, FLEXRAY, LIN). However, in some multi-camera systems, such as surround view video systems, bus connections for each video camera are undesirable, due to the increased component and wiring costs. Thus, a different approach is contemplated.

SUMMARY

In one embodiment, the invention provides that, in order to overcome limitations associated with low-cost video camera systems, data of interest for a video camera is embedded in the active video stream and separated from the video stream at a remote ECU. Data that is stored in a non-volatile memory can be embedded and encoded onto the outgoing video stream.

In one embodiment, the invention provides a method for transmitting camera-based parameters and a video stream from a video camera disposed for viewing a region of a vehicle to an electronic control unit mounted on the vehicle, comprising: generating a video stream with an image sensor mounted on the vehicle; transferring camera-based parameters onto the video stream and providing an analog signal carrying the video stream and the camera-based parameters; transmitting the analog signal to the electronic control unit; and retrieving the camera-based parameters from the analog signal.

In another embodiment, the region comprises an exterior region viewed from the vehicle, and the video camera comprises the image sensor mounted on the vehicle, a controller for receiving the camera-based parameters and an image signal processor for transferring the camera-based parameters onto the video stream to provide the analog signal, the arrangement further comprising displaying the video stream on a vehicle display based in part on the camera-based parameters.

In one embodiment, the analog signal comprises one of a NTSC analog signal and a PAL analog signal. In another embodiment, the analog signal comprises a NTSC analog signal and the camera-based parameters are provided as one or both of: pixels provided in a first horizontal line at a beginning of a frame of the NTSC analog signal and pixels provided in a last horizontal line at an end of the frame of the NTSC analog signal. The pixel data is decoded downstream for automotive applications. In another embodiment, the analog signal is a PAL analog signal and the camera-based parameters are provided as one or both of: pixels provided in a first horizontal line at a beginning of a frame of the PAL analog signal and/or pixels provided in a last horizontal line at an end of the frame of the PAL analog signal.

In another embodiment, dynamic information is read from the image sensor and transformed into pixels that are encoded onto an outgoing video stream. Pixels with non-video parameters are encoded in corner areas of a frame of the NTSC analog signal that is a 180 degree video image taken away from a driver's field of view. The pixels are decoded downstream at the ECU for automotive applications. In one embodiment, the analog output video camera is a PAL analog output video camera and non-video pixels are encoded in corner areas of a frame of a PAL analog signal.

In another embodiment, the invention provides a sequence of data that is a non-video data identifier. The non-video data identifier indicates that camera-based parameters follow in sequence.

In one embodiment, the camera-based parameters comprise at least one of camera calibration parameters and camera self-monitoring parameters. In one embodiment, the camera calibration parameters comprise lens properties and the self-monitoring parameters comprise at least one of a frame counter and a temperature value for the video camera, along with the video camera comprising one of a plurality of video cameras connected to the electronic control unit.

In another embodiment, the video camera comprises the image sensor, a controller with non-volatile memory and an image signal processor for providing the analog signal to the electronic control unit, and the region that is viewed is an interior region of the vehicle.

In one embodiment, the camera-based parameters retrieved from the analog signal control display of the video stream on a vehicle display. In another embodiment, the analog signal is transmitted to the electronic control unit on a single channel, and free from a dedicated back channel.

In one embodiment of the invention, a vehicle system for transmitting camera-based parameters and a video stream, comprises a video camera disposed on a vehicle for viewing a region of a vehicle, the video camera comprising: an image sensor for generating video images and obtaining the video stream of the region of the vehicle; a controller for providing camera-based parameters; and an image signal processor configured to: receive the video stream from the image sensor, receive camera-based parameters from the controller, and transfer the camera-based parameters onto the video stream and output an analog signal comprising the video stream and the camera-based parameters, the vehicle system further comprising an electronic control unit including a video receiver, the electronic control unit configured to: receive the analog signal from the video camera, and retrieve the camera-based parameters from the analog signal.

In one embodiment, a vehicle display is configured to receive the video stream provided by the electronic control unit and to display the video stream to a vehicle operator in the vehicle, and the region of the vehicle comprises an exterior region viewed from the vehicle.

In one embodiment, the camera-based parameters are provided as one or both of: pixels provided in a first horizontal line at a beginning of a frame of the analog signal and pixels provided in a last horizontal line at an end of the frame of the analog signal.

In another embodiment, the camera-based parameters are embedded as pixels in corners of a frame of a video image of the video stream carried by the analog signal.

In one embodiment, the camera-based parameters are transferred onto the video stream following a non-video data identifier that is transferred onto the video stream.

In one embodiment, the camera-based parameters comprise at least one of camera calibration parameters and camera self-monitoring parameters, and the video camera comprises one of a plurality of video cameras connected to the electronic control unit. In one embodiment, the video stream is output based on the camera parameters.

In another embodiment, the controller includes a non-volatile memory, and the video camera is configured to transmit the analog signal to the electronic control unit on a single channel, and wherein the vehicle system is free from a dedicated back channel.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
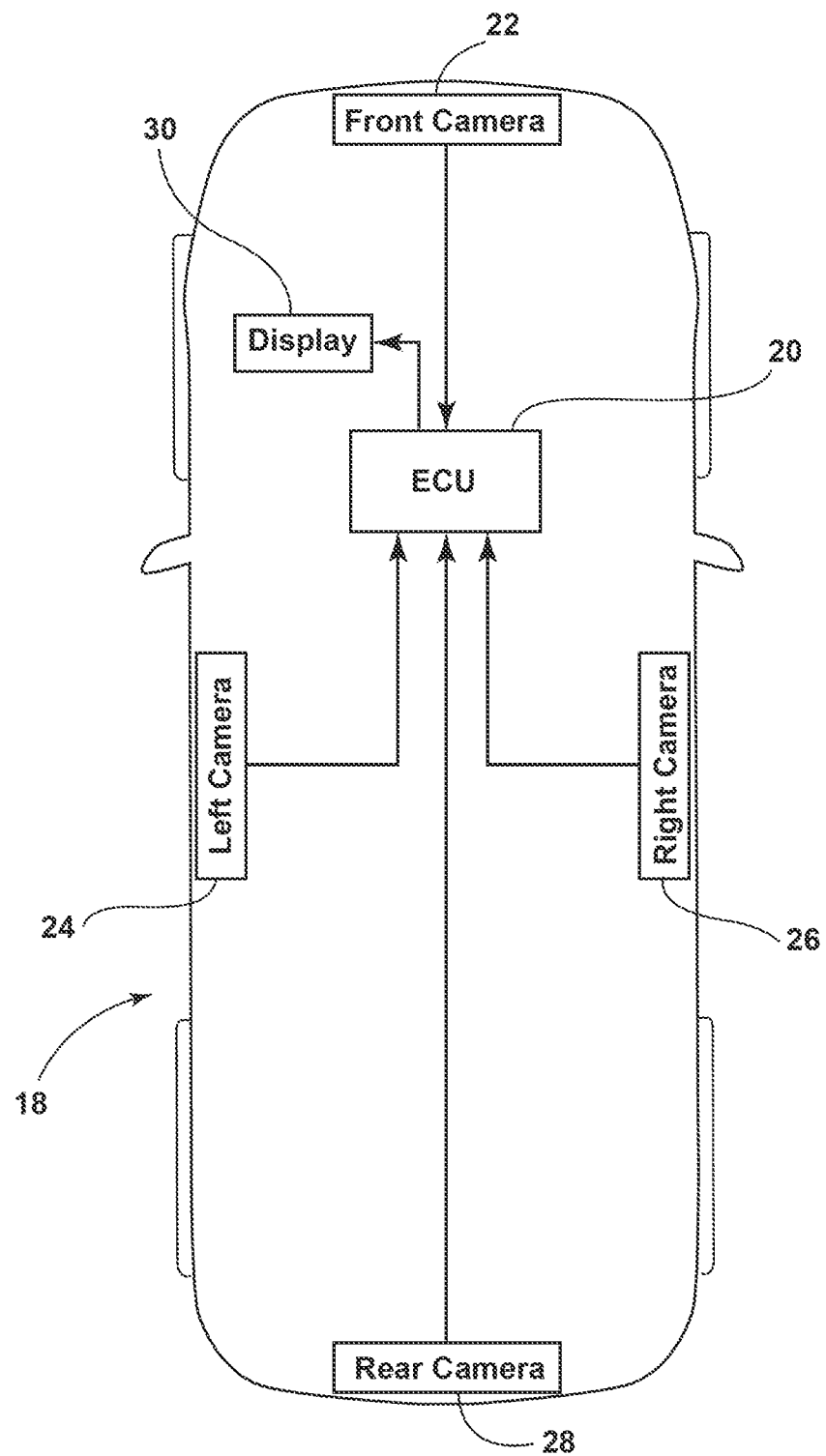
FIG. 1 is a block diagram of a vehicle having multiple video cameras.

As shown in the block diagram of FIG. 1, a vehicle 18 includes an electronic control unit (ECU) 20 that receives video streams from a front view video camera 22, a left side view video camera 24, a right side view video camera 26 and a rear view video camera 28 disposed about the vehicle. The video cameras each obtain a video stream from a respective exterior region of the vehicle 18. The ECU 20 receives video images from each of the video cameras and processes same to obtain a vehicle surround view image that is output on a vehicle display 30. Thus, the vehicle system provides images about the entirety of the vehicle 18 for the vehicle display 30. In some embodiments, a single video camera provides a video stream to the ECU 20 that outputs a single video camera view on the vehicle display 30 for viewing by a vehicle operator in a driver's seat. In another embodiment, the video cameras are disposed for viewing an interior region of the vehicle 18. Any plurality of video cameras is contemplated.

Figure 2:
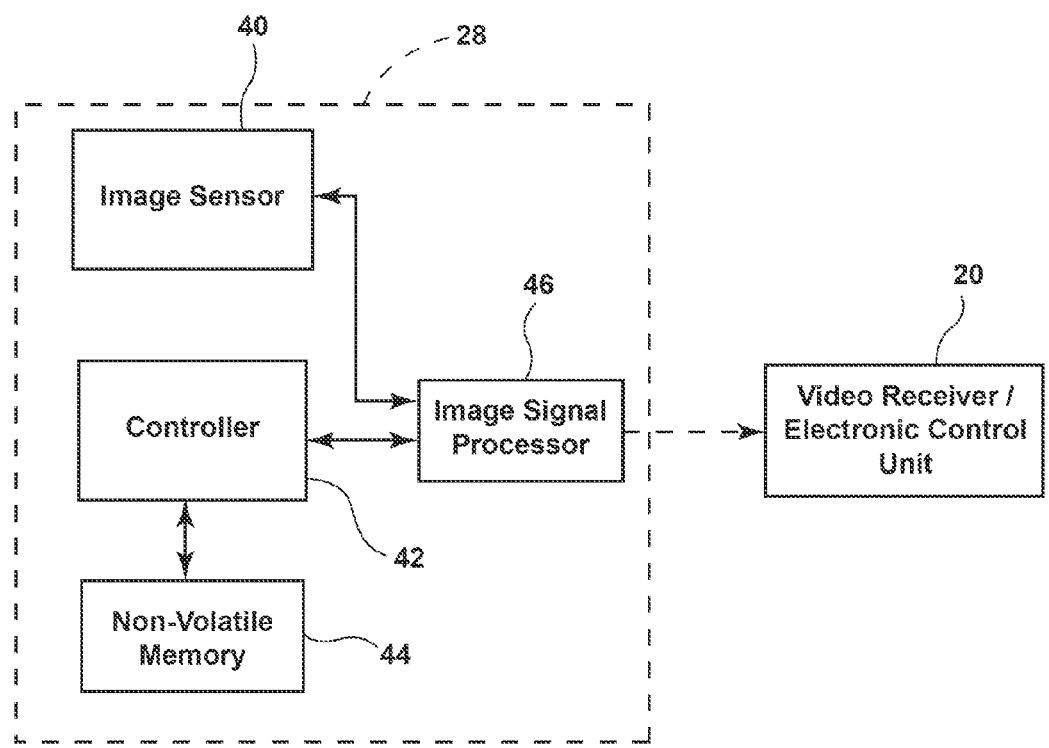
FIG. 2 shows a block diagram of a video camera and an electronic control unit.

FIG. 2 shows a block diagram of the rear view video camera 28 for providing video images with embedded camera-based parameters to a video receiver of the ECU 20. The rear view video camera 28 includes an image sensor 40, a controller 42 connected to non-volatile memory 44 and a video or image signal processor 46 that transfers camera-based parameters combined with a video stream to an ECU 20. While FIG. 2 shows the rear view video camera 28 including the image sensor 40, the controller 42, the non-volatile memory 44 and the image signal processor 46 separately within a video camera 28, in some embodiments, the devices are a single component.

In a method of operation, the controller 42 obtains camera-based parameters, such as metadata or performance metrics from the non-volatile memory 44 and provides same to the image signal processor 46. The camera-based parameters can be at least one of camera calibration parameters and/or dynamic camera self-monitoring parameters, along with metadata and performance metrics for the video camera 28. In some embodiments, the calibration parameters include lens properties of a lens of the video camera 28. In one embodiment, the self-monitoring parameters include a frame counter. In one embodiment, the self-monitoring parameters include a sensed temperature value of the image sensor 40 and/or voltage values of components of the video camera 28. The parameters can provide an idea of video camera status and potential failure of the video camera 28. The image signal processor 46 is configured to encode or embed the data parameters provided by the controller 42 onto the video stream from the image sensor 40. The image signal processor 46 is configured to transfer the encoded analog video stream or analog signal to the ECU 20. In some embodiments, dynamic information from the image sensor 40 is transformed into, or embedded/encoded, onto the outgoing live or essentially real-time video stream to form the analog signal.

The non-video data representing camera-based parameters provided in the active video stream are separated from the analog signal in the ECU 20. The ECU 20 retrieves the camera-based parameters from the analog signal to obtain the video stream. More specifically, the non-video data representing camera based parameters that originated in non-volatile memory 44 or from sensors of the image sensor 40 is decoded. The ECU 20 includes a video receiver and a processor configured to separate the non-video data of the camera-based parameters and the video stream from the analog signal. The ECU 20 is also configured to control the vehicle display 30, in some embodiments partly in view of the non-video data or provides information related to the camera-based parameters to other devices or the like.

Figure 3:
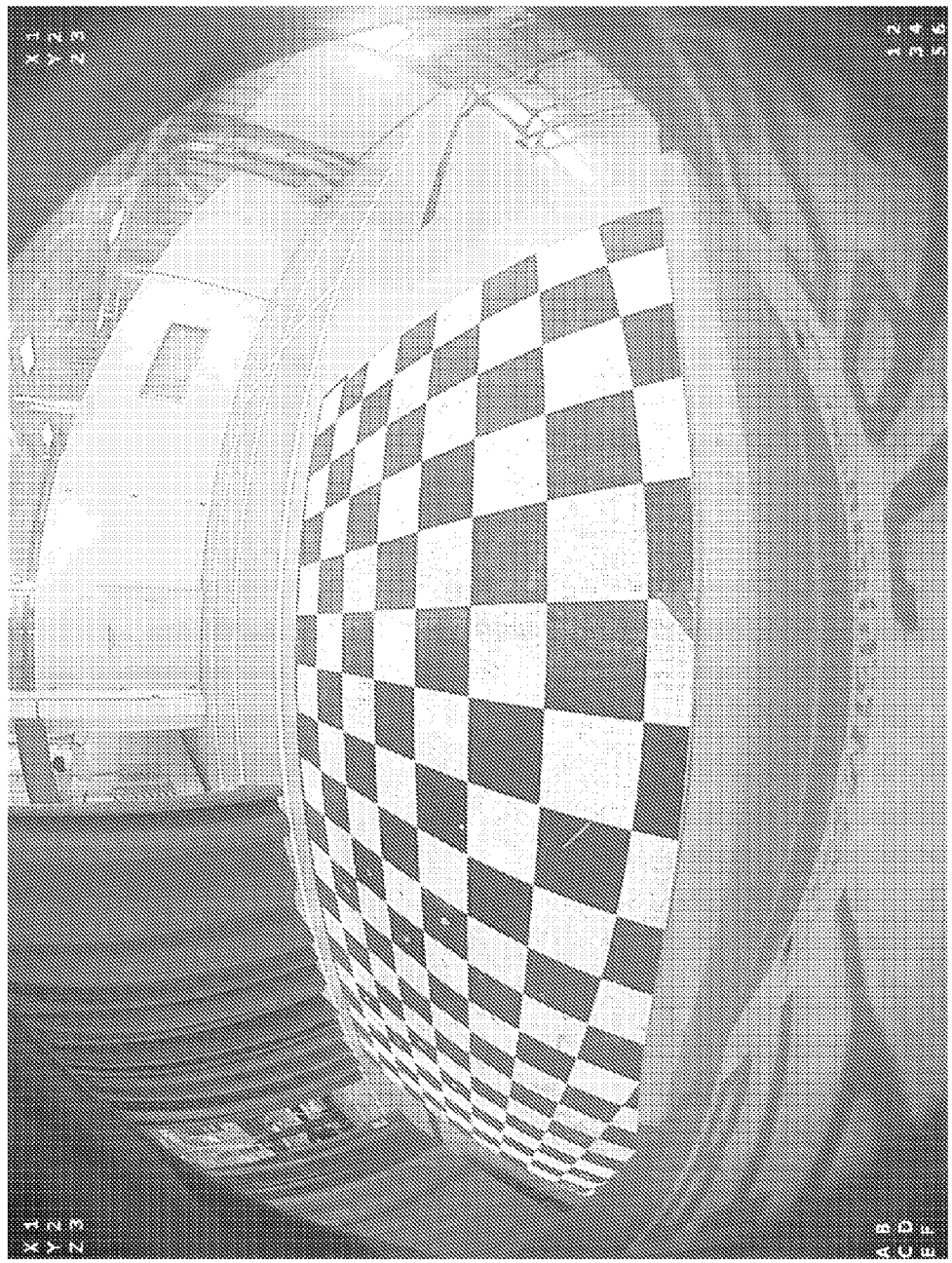
FIG. 3 is a 180 degree video image including transferred non-video data that is displayed.

A transferred or embedded signal can be visualized in multiple ways, but there are various particular methods that may prove most applicable. In one method, the transferred or embedded pixels are placed in areas of a video image of the video stream that do not degrade system functionality. For example, in a 180 degree panoramic camera, the applicable data is provided in the vignette present in each image corner as shown in FIG. 3. While one may consider this data illustrated in the corners of FIG. 3 to be an overlay, such an interpretation is misleading. While the non-video data is shown in FIG. 3, this data is not displayed on the vehicle display 30 provided in the driver's field of view and thus does not act as an overlay. Accordingly, the data can be overwritten without causing significant video system degradation.

Figure 4:
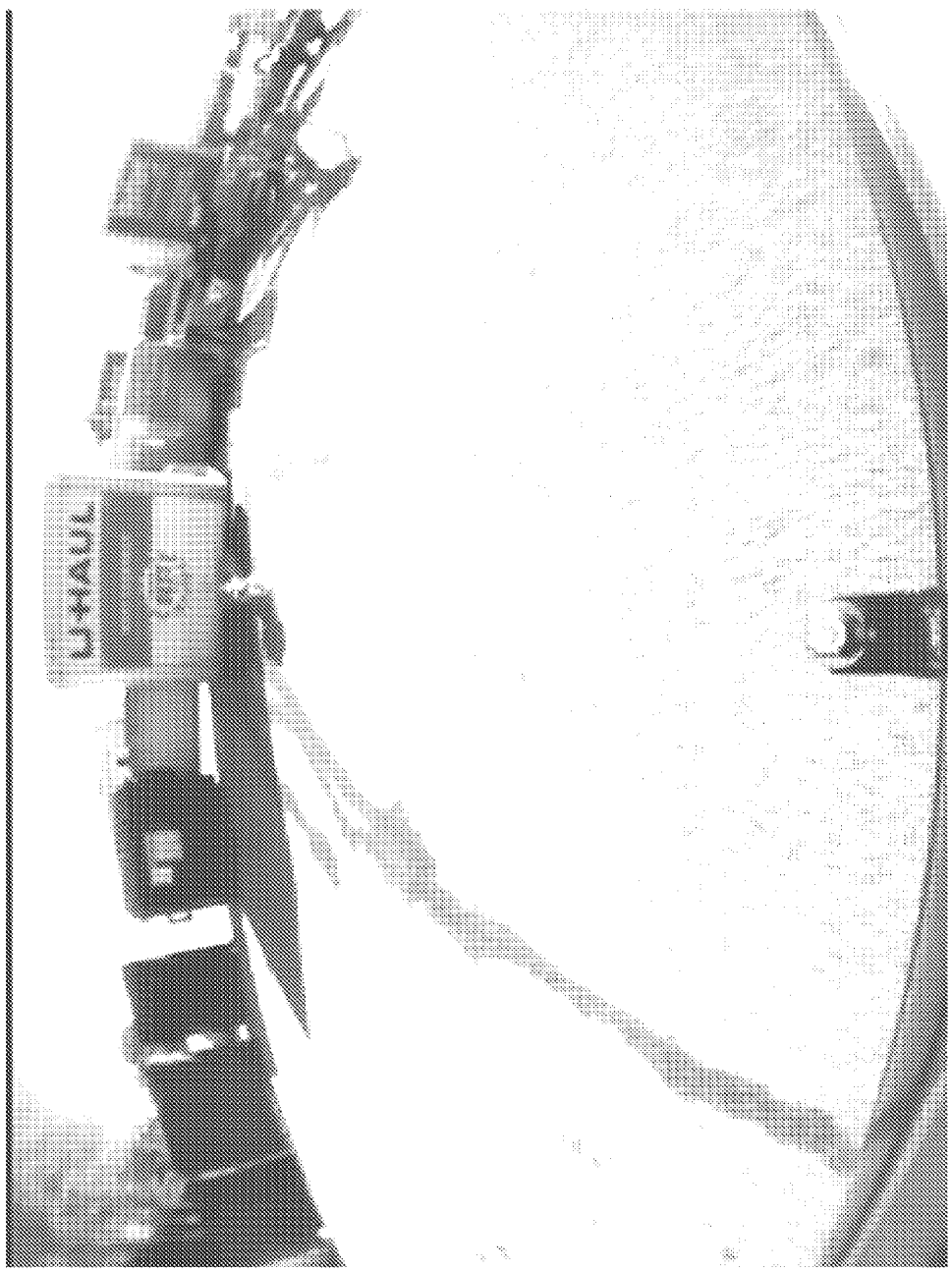
FIG. 4 is a 180 degree video image including non-video data encoded on a single line of the image.

For any NTSC video camera, data for the camera-based parameters can be encoded as pixels on a single line of a NTSC analog signal. The embedded pixels mask a single image line and use known NTSC levels to encode relevant camera parameter data. This arrangement is shown in FIG. 4, wherein the first horizontal line at the top of the image is encoded data. Thus, the top horizontal line in FIG. 4 appears solid black. If a horizontal line for the data of the camera-based parameters is chosen at the beginning of a frame and/or at the end of the frame representing the last horizontal line, the ECU 20 is programmed to prevent the vehicle display 30 from showing the line of non-video data. Therefore, as in the FIG. 3 embodiment, encoded non-video data is not shown on the vehicle display 30.

In another embodiment, a PAL video camera is provided that outputs a PAL analog signal. The camera-based parameters can be encoded as pixels on a single line of a PAL analog signal or at both first and last lines of a PAL frame. The embedded pixels mask a single image line and use known PAL levels to encode relevant camera parameter data. Thus, the embodiment with a PAL video camera operates in a similar way as the NTSC video camera.

In another embodiment, a sequence of data provided in the analog signal from the video camera 28 that is a non-video data identifier is embedded in the video stream by the image signal processor 46. Thereafter, the image signal processor 46 also transfers camera-based parameters onto the video stream. The non-video data identifier acts as a flag/marker that indicates that camera-based parameters will follow. The processor of the electronic control unit 20 is programmed to search for the non-video data identifier during processing of the analog signal. When the non-video data identifier is identified, a certain number of pixels thereafter are also not displayed, and instead are processed as camera-based parameters. The non-video data is removed from the analog signal so that the video stream remains for display.

By combining the camera parameters with the video stream and forming an analog signal, the video camera 28 transmits the resulting analog signal on a single channel to the ECU 20. Thus, a dedicated back channel is not required, and therefore the system is free from a dedicated back channel.

Thus, the invention provides, among other things, a vehicle system and method for encoding the camera-based parameters onto an analog video stream that is decoded downstream, as well as providing the non-video camera-based parameters as "pixels" in an analog video stream. Various features and advantages of the invention are set forth in the following claims.

What is claimed is:

1. A method for transmitting camera-based parameters and a video stream from a video camera disposed for viewing a region of a vehicle to an electronic control unit mounted on the vehicle, comprising:
   generating a video stream with an image sensor mounted on the vehicle;
   transferring camera-based parameters onto the video stream and providing an analog signal carrying the video stream and the camera-based parameters;
   transmitting the analog signal to the electronic control unit; and
   retrieving the camera-based parameters from the analog signal.

2. The method according to claim 1, including displaying the video stream, and wherein the region comprises an exterior region viewed from the vehicle, and wherein the video camera comprises the image sensor mounted on the vehicle, a controller for receiving the camera-based parameters and an image signal processor for transferring the camera-based parameters onto the video stream to provide the analog signal, the method further comprising displaying the video stream on a vehicle display based in part on the camera-based parameters.

3. The method according to claim 1, wherein the analog signal comprises one of a NTSC analog signal and a PAL analog signal.

4. The method according to claim 1, wherein the analog signal comprises a NTSC analog signal and the camera-based parameters are provided as one or both of: pixels provided in a first horizontal line at a beginning of a frame of the NTSC analog signal and pixels provided in a last horizontal line at an end of the frame of the NTSC analog signal.

5. The method according to claim 1, wherein the analog signal comprises a NTSC analog signal and the camera-based parameters are embedded as pixels in corners of a frame of an image carried by the NTSC analog signal.

6. The method according to claim 1, wherein the camera-based parameters are transferred onto the video stream following a non-video data identifier that is transferred onto the video stream.

7. The method according to claim 1, wherein the camera-based parameters comprise at least one of camera calibration parameters and camera self-monitoring parameters.

8. The method according to claim 7, wherein the camera calibration parameters comprise lens properties.

9. The method according to claim 7, wherein the self-monitoring parameters for the method comprise at least one of frame counter and a temperature value for the video camera, and the video camera comprises one of a plurality of video cameras connected to the electronic control unit.

10. The method according to claim 1, wherein the video camera comprises the image sensor, a controller with non-volatile memory and an image signal processor for providing the analog signal to the electronic control unit, and wherein the region that is viewed is an interior region of the vehicle.

11. The method according to claim 1, including providing the camera-based parameters retrieved from the analog signal to control displaying of the video stream on a vehicle display.

12. The method according to claim 1, wherein transmitting the analog signal to the electronic control unit comprises transmitting the analog signal on a single channel, and wherein the method is free from a dedicated back channel.

13. A vehicle system for transmitting camera-based parameters and a video stream, comprising:
a video camera disposed on a vehicle for viewing a region of a vehicle, the video camera comprising:
an image sensor for generating video images and obtaining the video stream of the region of the vehicle;
a controller for providing camera-based parameters; and
an image signal processor configured to:
receive the video stream from the image sensor,
receive camera-based parameters from the controller, and
transfer the camera-based parameters onto the video stream and output an analog signal comprising the video stream and the camera-based parameters,
an electronic control unit including a video receiver, the electronic control unit configured to:
receive the analog signal from the video camera; and
retrieve the camera-based parameters from the analog signal.

14. The vehicle system according to claim 13, further comprising a vehicle display configured to receive the video stream provided by the electronic control unit and to display the video stream to a vehicle operator in the vehicle, and wherein the region of the vehicle comprises an exterior region viewed from the vehicle.

15. The vehicle system according to claim 13, wherein the camera-based parameters are provided as one or both of: pixels provided in a first horizontal line at a beginning of a frame of the analog signal and pixels provided in a last horizontal line at an end of the frame of the analog signal.

16. The vehicle system according to claim 13, wherein the camera-based parameters are embedded as pixels in corners of a frame of a video image of the video stream carried by the analog signal.

17. The vehicle system according to claim 13, wherein the camera-based parameters are transferred onto the video stream following a non-video data identifier that is transferred onto the video stream.

18. The vehicle system according to claim 13, wherein the camera-based parameters comprise at least one of camera calibration parameters and camera self-monitoring parameters, and the video camera comprises one of a plurality of video cameras connected to the electronic control unit.

19. The vehicle system according to claim 18, wherein the electronic control unit is configured to output the video stream based at least in part on the camera-based parameters.

20. The vehicle system according to claim 13, wherein the controller includes a non-volatile memory, and wherein the video camera is configured to transmit the analog signal to the electronic control unit on a single channel, and wherein the vehicle system is free from a dedicated back channel.

* * * * *